United States Patent
Sennett et al.

(10) Patent No.: US 8,681,709 B2
(45) Date of Patent: Mar. 25, 2014

(54) DYNAMIC ALLOCATION OF COMMUNICATIONS RESOURCES

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1111 days.

(21) Appl. No.: 12/056,991

(22) Filed: Mar. 27, 2008

(65) Prior Publication Data

US 2009/0247204 A1    Oct. 1, 2009

(51) Int. Cl.
*H04W 4/00* (2009.01)
*H04M 11/04* (2006.01)

(52) U.S. Cl.
USPC .................. 370/329; 370/330; 455/404.1

(58) Field of Classification Search
USPC ........................................ 370/329
See application file for complete search history.

(56) References Cited

U.S. PATENT DOCUMENTS

| 6,058,307 | A * | 5/2000 | Garner .......................... 455/428 |
| 6,208,859 | B1 * | 3/2001 | Halvorson .................... 455/430 |
| 6,366,780 | B1 * | 4/2002 | Obhan ........................ 455/453 |
| 6,985,455 | B1 * | 1/2006 | Heath et al. ................... 370/316 |
| 2006/0160543 | A1 * | 7/2006 | Mashinsky ............... 455/452.2 |
| 2006/0212588 | A1 * | 9/2006 | Haner et al. .................. 709/229 |
| 2008/0013462 | A1 * | 1/2008 | Ye et al. ........................ 370/252 |
| 2008/0117869 | A1 * | 5/2008 | Freen et al. ................... 370/329 |
| 2009/0054029 | A1 * | 2/2009 | Hogberg et al. ............ 455/404.2 |
| 2009/0069008 | A1 * | 3/2009 | Highsmith et al. ........... 455/424 |
| 2009/0143046 | A1 * | 6/2009 | Smith ........................ 455/404.1 |
| 2009/0196180 | A1 * | 8/2009 | Bahl et al. ..................... 370/235 |

* cited by examiner

*Primary Examiner* — Shaq Taha
(74) *Attorney, Agent, or Firm* — Baker & Hostetler LLP

(57) ABSTRACT

In a communications spectrum shared by public safety users and commercial users, in the event of an emergency condition, commercial users are preempted and corresponding bandwidth is reallocated to authorized public safety users. When the emergency condition subsides, the reallocated bandwidth is made available for commercial use. Reallocation and preemption can be initiated by an authorized public safety entity and/or can be initiated when public safety usage exceeds a predetermined usage threshold.

15 Claims, 6 Drawing Sheets

DYNAMIC ALLOCATION OF COMMUNICATIONS RESOURCES

TECHNICAL FIELD

The technical field generally relates to communications systems and more specifically relates to the allocation of communications resources for public safety applications.

BACKGROUND

When television broadcasts convert from analog format to digital format, a portion of the spectrum currently utilized in conjunction with the analog format will become available. Some of the available spectrum will be reserved for commercial use and some of the available spectrum will be reserved for public safety use. In some cases however, when the need for public safety use increases (e.g., natural disaster, police activity, etc.), contention for use of the shared spectrum may exist between the commercial services and public safety.

SUMMARY

Portions of a designated, shared, spectrum are dynamically allocated to allow a user to utilize additional portions of the spectrum. In an example embodiment, a portion of the designated spectrum is dynamically allocated to allow a public safety user to preempt use of the spectrum by a commercial user. For example, the dynamic reallocation is performed in the event of an emergency condition. When the need for the reallocation (e.g., emergency condition) has been addressed and the need for additional bandwidth subsides, the usage of the reallocated bandwidth is reverted back to the appropriate user.

In an example configuration, public safety usage of a serving network is analyzed to determine if a predetermined usage threshold has been reached and/or to predict when additional bandwidth will need to be allocated. In an example embodiment, the additional bandwidth allocation can be for usage related to a specific area, such as an emergency area. A public safety application, executing on a call processing server for example, can then inform a customer usage application that additional bandwidth is needed in the specific area. The request for additional bandwidth can be initiated automatically by the public safety application and/or can be manually initiated by an authorized public safety individual. If the additional spectrum is currently unused, it is allocated immediately for public safety usage. If there is no unused spectrum available, the commercial usage application can identify active voice and/or data sessions for preemption. The identified sessions can then be preempted in accordance with priority and the additional bandwidth made available for public use.

When the public safety usage drops below the predetermined usage threshold, or when the public safety application receives a notification that the additional bandwidth is no longer needed for public safety use, the reallocated bandwidth can be reverted back to commercial use. The public safety application reverts to assigning new voice or data sessions only within its designated spectrum and the commercial application is notified that the designated commercial spectrum is again available for commercial usage.

BRIEF DESCRIPTION OF THE DRAWINGS

The foregoing and other objects, aspects and advantages of dynamic allocation of communications resources will be better understood from the following detailed description with reference to the drawings.

DETAILED DESCRIPTION OF ILLUSTRATIVE EMBODIMENTS

It is expected that in the year 2008, as a result of the conversion of analog television broadcast to digital television broadcast, communications bandwidth will become available. A 10 MHz portion of the communications spectrum is centered about 700 MHz. And, it is this 10 MHz portion of the communications spectrum that is expected to be made available as a shared spectrum for commercial users and public safety users. It is to be understood however, that the herein described dynamic allocation of communications resources is not limited to a 10 MHz spectrum centered about 700 MHz, but is applicable to any appropriate shared spectrum.

As described herein, utilization of this bandwidth by commercial users and public safety users is accomplished via dynamically allocating bandwidth. In an example configuration, public safety users will be allocated half of the shared spectrum and commercial users will allocated the other half of the shared spectrum (e.g., 5 MHz each). When authorized public safety users need additional spectrum beyond their normal levels due to emergency conditions, the authorized public safety users can utilize the commercial side of the shared spectrum and can preempt commercial usage. In the case of an event, such as an emergency or the like, which requires the public safety users to utilize more of the spectrum, additional bandwidth will be reallocated to the public safety users to respond to the event. When the event or need for additional bandwidth subsides, the reallocated bandwidth will be made available for use by the preempted user, or other appropriate user. In various configurations, an authorize public safety user will be able to preempt other public safety users having lower priorities, as well as preempt commercial users.

Figure 1:
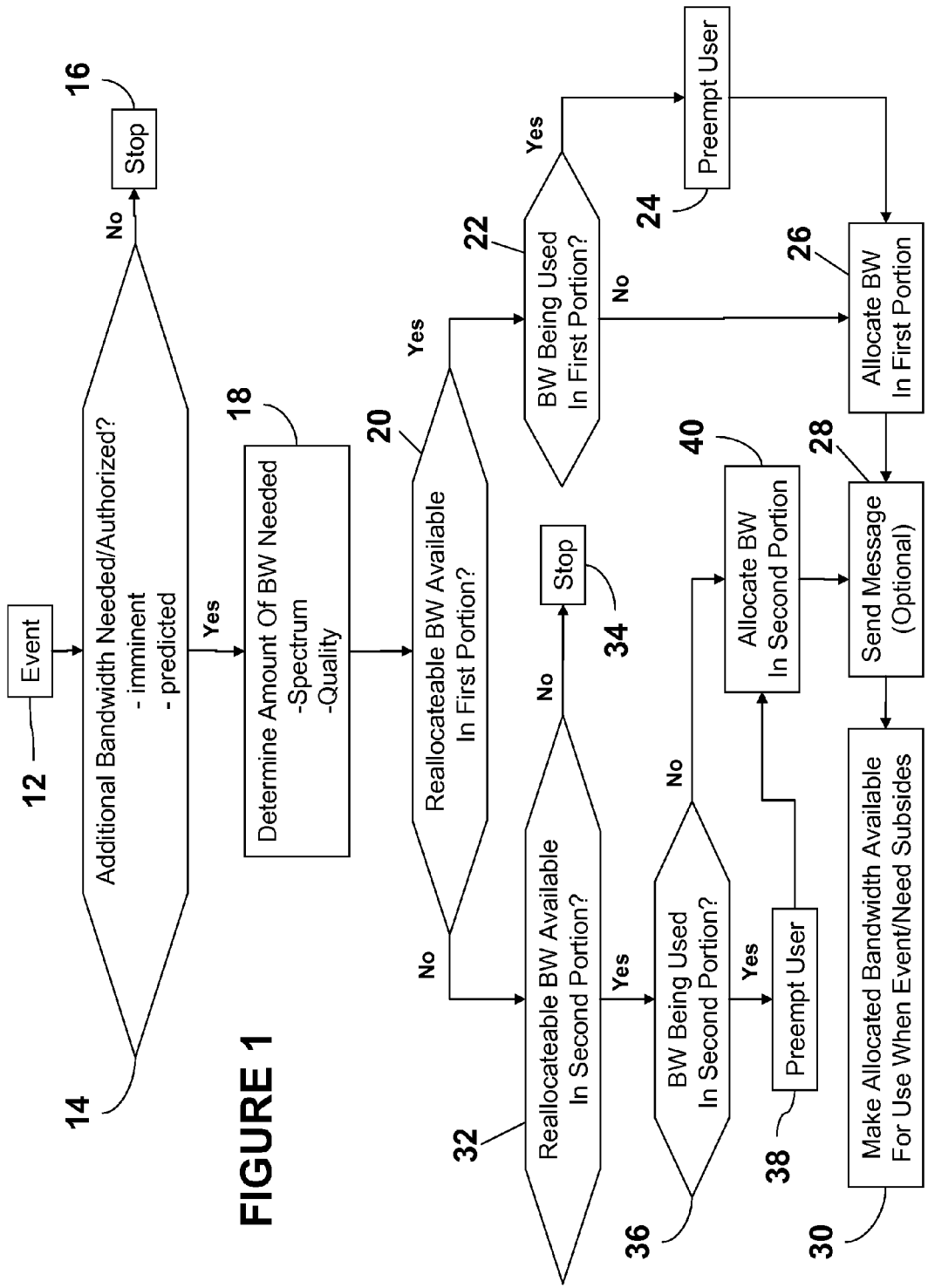
FIG. 1 is a flow diagram of an example process for dynamically allocating communications resources.

FIG. 1 is a flow diagram of an example process for dynamically allocating communications resources. At step 12 an event occurs. The event can be any appropriate event such as a natural disaster, an emergency, police activity, fire department activity, or the like. For example, a police officer may want to transmit real time video of a crime. The transmission, in real time, of the crime as it is occurring, may require more bandwidth than is currently allocated to the police officers mobile device. Thus, the police officer would request additional bandwidth, and upon receiving approval of the request, transmit the real-time video. As another example, first responders and other emergency personnel may require additional communication bandwidth in the case of a predicted meteorological event, such as a tornado or hurricane. Thus event at step 12 can include imminent and predicted events.

At step 14, it is determined if additional bandwidth is needed. The determination can be in response to an imminent need for the additional bandwidth, or a predicted need for the additional bandwidth. The above example scenario in which the police officer desires to transmit real-time video is an example of an imminent need for additional bandwidth. And, the above example scenario involving the meteorological event is an example of a predicted need for additional bandwidth. If it is determined, at step 14, that no additional bandwidth is needed, the process stops step 16. If it is determined, at step 14, that additional bandwidth is needed, it is determined if the entity needed the additional bandwidth is authorized to be allocated additional bandwidth. The entity needing the additional bandwidth must be an authorized entity. Thus, it is determined if the entity is an authorized entity at step 14. An authorized entity can comprise any appropriate entity authorized to request additional bandwidth. In an example embodiment, an authorized entity is a public safety user, emergency manager, Emergency Operations Center (EOC), on-site Incident Commander, public utility, hospital, blood bank, etc. If the entity is not an authorized entity, the process stops at step 16.

If it is determined, at step 14, that additional bandwidth is needed and that the entity is an authorized entity, the amount of bandwidth needed is determined at step 18. The amount of additional bandwidth needed can be determined in accordance with any appropriate means. For example the amount of additional bandwidth needed can be determined solely on the expected amount of data to be transmitted and/or on the expected quality of the data to be transmitted. For example, video could be transmitted in various resolutions. A higher resolution would require more bandwidth than a lower resolution. It is to be understood that data can comprise any information to be communicated, including voice data, video data, multimedia data, telemetric data, biometric sensor data, radiological sensor data, chemical sensor data, biological sensor data, or the like, for example.

At step 20, it is determined if reallocateable bandwidth is available in the portion of the spectrum being utilized by the authorized entity. In an example embodiment the first portion of the spectrum comprises the portion of the spectrum designated for use by public safety users, and the second portion of the spectrum comprises the portion of the spectrum designated for use by commercial users. For example, if the authorized entity is a public safety user, the portion of the spectrum being utilized by public safety users is checked, at step 20, to determine if the bandwidth needed (as determined at step 18) is available in the portion of the spectrum being utilized by public safety users. Bandwidth could be available if the authorized entity has a higher priority than other users. For example, if the authorized entity is a public safety user having the highest priority available to public safety users, and other public safety users in the portion of the spectrum (first portion) being utilized by public safety users have a lower priority, than bandwidth is available. At step 22, it is determined if available bandwidth is being utilized by another user. If bandwidth is not being utilized by another user, as determined at step 22, bandwidth from the first portion is allocated to the authorized entity as step 26. If bandwidth is being utilized by another user, as determined at step 22, the user is preempted in step 24. In an example embodiment, preemption of the user would occur only if this new public safety requestor is of a higher priority than the current public safety requester. The candidate public safety requestors would be sorted from lowest priority to highest priority so that the lowest priority users would be preempted first.

The newly available bandwidth is allocated to the authorized entity at step 26. At step 28, a message can be sent to the preempted user that the preempted user is being preempted for public safety reasons. This message is optional. The message can be sent prior to preempting the user, during preemption of the user, or after preemption of the user. At step 30, when the event ends and/or the need for the available bandwidth subsides, the re-allocated bandwidth is made available for use by other users. In an example embodiment, this bandwidth is made available to the preempted user. In other example embodiments, this bandwidth is available for other users, which may or may not include the preempted user. Optionally, and not depicted in FIG. 1, a message can be provided indicating that the previously reallocated bandwidth is now available for use.

At step 20, if reallocateable bandwidth is not available in the first portion, the second portion is checked at step 32. That is, the second portion of the spectrum is analyzed to determine if reallocateable bandwidth is available, at step 32. For example, if no reallocateable bandwidth is available in the portion of the spectrum designated for use by public safety users (e.g., the first portion), then the portion of the spectrum dedicated for use by commercial users (e.g., the second portion) is checked for the availability of reallocateable bandwidth. If no reallocateable bandwidth is available in the second portion of the spectrum the process stops at step 34. Example situations in which the bandwidth would not be available include emergency calls (e.g., 911 calls), priority service calls (e.g., wireless priority service or multimedia priority service), or any other call that has been marked as now preemptable. If reallocateable bandwidth is available in the second portion (as determined at step 32), at step 36, it is determined if available bandwidth is being utilized by another user. If bandwidth is not being utilized by another user, as determined at step 36, bandwidth from the second portion is allocated to the authorized entity at step 40. If bandwidth is being utilized by another user, as determined at step 36, the user is preempted in step 38. In an example embodiment, if a public safety user is using a portion of bandwidth in the second portion, the public safety user will not be preempted. Instead, only commercial users using bandwidth in the second portion are considered for preemption. In another example embodiment, if a public safety user is using a portion of bandwidth in the second portion, the public safety user will not be preempted unless the authorized entity has a higher priority than the public safety user. The newly available bandwidth is allocated to the authorized entity at step 40. At step 28, a message can be sent to the preempted user that the preempted user is being preempted for public safety reasons. This message is optional. The message can be sent prior to preempting the user, during preemption of the user, or after preemption of the user. At step 30, when the event ends and/or the need for the available bandwidth subsides, the re-allocated bandwidth is made available for use by other users. In an example embodiment, this bandwidth is made available to the preempted user. In other example embodiments, this bandwidth is available for other users, which may or may not include the preempted user. Optionally, and not depicted in FIG. 1, a message can be provided indicating that the previously reallocated bandwidth is now available for use.

Figure 2:
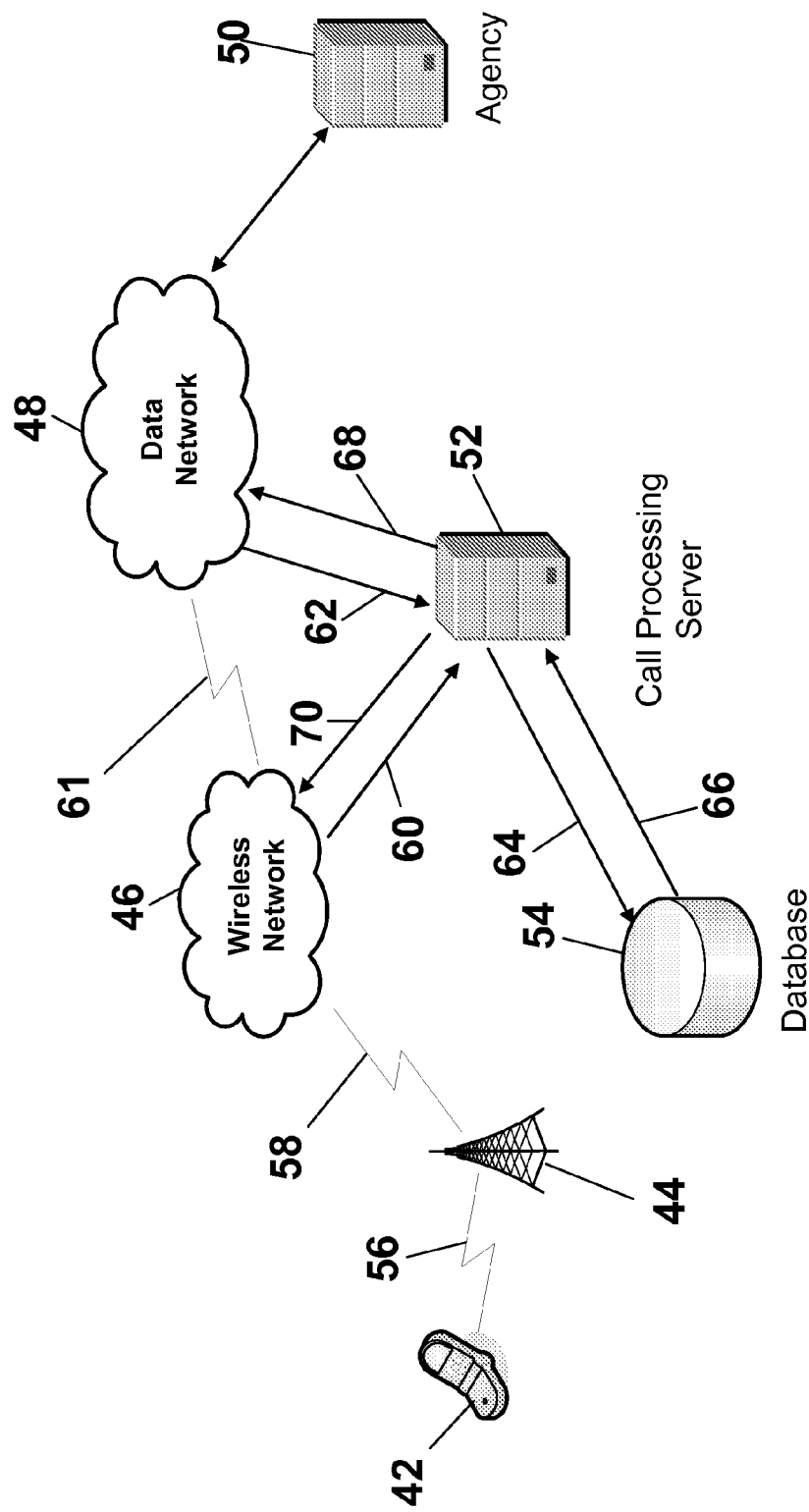
FIG. 2 is a diagram of an example system and process for dynamically allocating communications resources.

FIG. 2 is a diagram of an example system and process for dynamically allocating communications resources. In an example embodiment, a user such as a public safety user (user not shown in FIG. 2), via a mobile device 42, requests additional bandwidth to communicate with an agency 50. In another example embodiment, a call processing server 52 monitors communications between the mobile device 42 and the agency 50 to determine if additional bandwidth is needed. Public safety users can comprise any appropriate users such as, for example, law enforcement personnel, medical personnel, first responders, National Weather Service personnel, or the like. The corresponding agency 50 can comprise any appropriate agency such as, for example, law enforcement headquarters, a hospital or clinic, a dispatch center, National Weather Service offices, or the like. For illustrative purposes, in an example scenario, a user can be a paramedic providing medical assistance to a patient. The agency 50 can be a hospital. The paramedic may need additional bandwidth to provide telemetric and voice date to the agency (hospital) 50 in order to provide medical services to the patient.

In an example process utilizing the system depicted in FIG. 2, a user sends a request for additional bandwidth via mobile device 42 at step 56. The request is provided via cellular network 44 to a wireless network 46 at step 58. The request can be provided at step 60 directly to the call processing server 52 and/or via an optional data network 48 at steps 61 and 62. The wireless network 46 can comprise any appropriate wireless network. The data network 48 can comprise any appropriate network such as an intranet, Internet, LAN, WAN, or the like. Upon receipt of the request, the call processing server 52 determines if the requester is authorized to request additional bandwidth. This can be determined by analyzing the ID of the mobile device 42 to determine if the mobile device 42 has been authorized, this can be determined in accordance with information (e.g., username, password, secret, or the like) provided by the requester to indicate that the requester is an authorized requester, or a combination thereof. In an example embodiment, the requester is authorized utilizing known cryptographic techniques. If the call processing server 52 determines that the requester is not an authorized requester, the call processing server 52 can terminate the request process and optionally send a message to the mobile device 42 indicating that the request has been denied. If the call processing server 52 determines that the requester is authorized to request additional bandwidth, the call processing server 52 then determines if bandwidth is available in the shared spectrum. As described with reference to FIG. 1, the call processing server 52 can check various portions of the shared spectrum and the users utilizing the various portions. In an example embodiment, the call processing server 52 works in conjunction with a database 54 to determine if the requester is authorized and/or if bandwidth is available in the shared spectrum. For example at step 64 the call processing server 52 can query the database 54 to determine if the requester is on a list of authorized requesters. Also at step 64 the call processing server 52 can query a database 54 to obtain an indication of available bandwidth in the shared spectrum. At step 66, the database 54 provides responses to the queries received via step 64. When available bandwidth is determined to exist, the call processing server 52 determines if the available bandwidth is in use. If the available bandwidth is not in use, the call processing server 52 allocates the bandwidth to the requester. If the available bandwidth is in use, the call processing server 52 preempts the user using the available bandwidth and reallocates the bandwidth to the requester. In an example embodiment, preemption is performed in accordance with predetermined priorities assigned to the requester and any users that may be using the available bandwidth. Accordingly, a requester having a specific priority will be able to preempt users having a lower priority than the requester's specific priority, and users with a lower priority will be preempted before users having higher priorities.

The call processing server 52 can reallocate bandwidth to the requester and preempt users at step 68 if data network 48 is utilized. The call processing server 52 can reallocate bandwidth to the requester and preempt users at step 70 if the call processing server is communicating directly to the wireless network 46. Preempted users can be coupled to the wireless network 46, the data network 48, or any commendation thereof.

In an example embodiment, rather than a requester requesting additional bandwidth, usage of the public safety spectrum is monitored by the call processing server 52. When the usage reaches a predetermined threshold, the call processing server 52 initiates reallocation of bandwidth and user preemption as needed. In an example embodiment, the call processing server 52 monitors the public safety spectrum within a specific area (e.g., the area of an emergency). In an example embodiment, the predetermined threshold is 90% of available usage. For example, if a current usage in the public safety spectrum is higher than 90% of the available bandwidth, the call processing server 52 would initiate reallocation of bandwidth. Another example in which the call processing server 52 could initiate reallocation of bandwidth is a scenario in which first responders are being dispatched to a major event like an earthquake, a large industrial fire or explosion, or the like. Based upon the size of the event and the amount of public resources being allocated to the event, either the public safety agency could initiate requests for additional bandwidth to be made available when the first responders arrive on the scene or the call processing server 52 could automatically calculate the amount of bandwidth request based upon the resources being deployed, could calculate the current bandwidth usage in the public safety spectrum, and then could initiate the requests for additional bandwidth required for the first responders being deployed to the incident.

In an example configuration the call processing server 52 comprises public safety applications and commercial applications. The public safety applications and commercial applications communicate therebetween to accomplish bandwidth reallocation and user preemption as needed. For example, a public safety application on the call processing server 52 can inform a commercial application that additional spectrum usage is required in a specific location. The request for additional spectrum can be initiated automatically by the public safety application or can be manually initiated by a duly authorized public safety individual. If the additional spectrum is currently unused, it can be allocated immediately to public safety usage.

When the emergency condition has been addressed and the need for additional spectrum subsides, the usage of the spectrum reallocated to public safety (e.g., to the requester) will drop below the predetermined usage threshold and the call processing server 52 can release the reallocated bandwidth for use by the preempted user and/or other users. The public safety applications in the call processing server 52 will revert to assigning new voice or data sessions within the portion of the shared spectrum designated for public safety use. Commercial applications can be notified that the portion of the shared spectrum designated for commercial is again available for commercial usage. Any public safety sessions which are still active in the normally commercial usage spectrum would not be preempted. The spectrum associated with these active sessions will be returned to the commercial applications when the public safety session terminates.

The mobile device 42 is representative of any appropriate type of mobile such as for example, a portable device, a variety of computing devices including a portable media player, e.g., a portable music player, such as an MP3 player, a Walkman, etc., a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., consumer electronic devices, such as TVs, DVD players, set top boxes, monitors, displays, etc., a public computing device, such as a kiosk, a non-conventional computing device, such as a kitchen appliance, a motor vehicle control (e.g., steering wheel), etc., biometric sensors, radiological sensors, chemical sensors, biological sensors, or a combination thereof.

Figure 3:
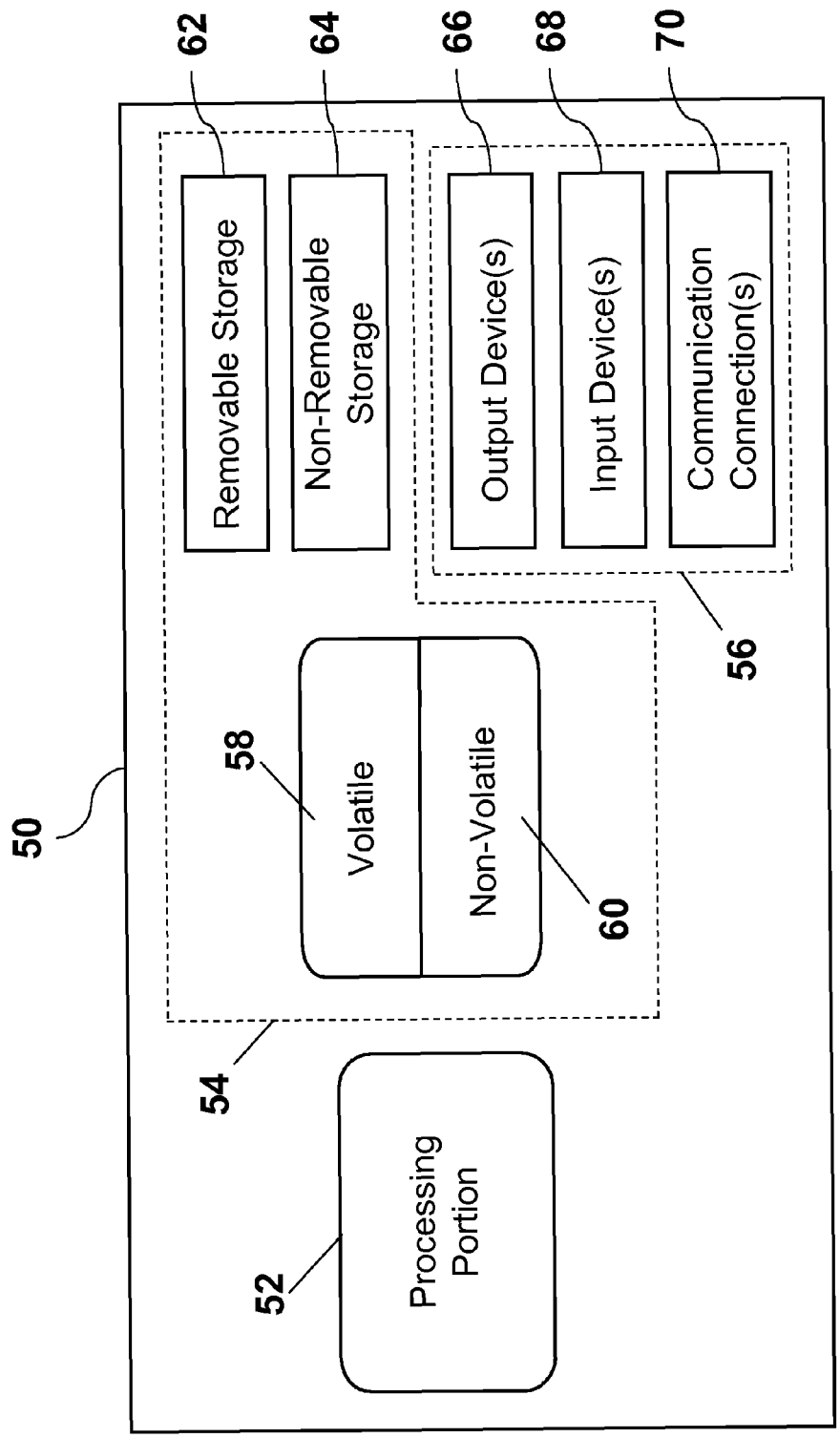
FIG. 3 is a block diagram of an example processor for dynamically allocating communications resources.

FIG. 3 is a block diagram of an example processor 72 for dynamically allocating communications resources. In an example configuration, the processor 72 comprises the call processing server 52, the database 54, various appropriate components of the wireless network 46, various appropriate components of the data network 48, or a combination thereof. It is emphasized that the block diagram depicted in FIG. 3 is exemplary and not intended to imply a specific implementation. Thus, the processor 72 can be implemented in a single processor or multiple processors. Multiple processors can be distributed or centrally located. Multiple processors can communicate wirelessly, via hard wire, or a combination thereof.

The processor 72 comprises a processing portion 74, a memory portion 76, and an input/output portion 78. The processing portion 74, memory portion 76, and input/output portion 78 are coupled together (coupling not shown in FIG. 3) to allow communications therebetween. The input/output portion 78 is capable of providing and/or receiving components utilized to dynamically allocate communications resources as described above. For example, as described above, the input/output portion 78 is capable of providing/receiving a request for additional bandwidth, a query for determining an authorized user, a query for determining potentially preemptable users, a command to reallocate bandwidth, a command to preempt a user, a message indicating that bandwidth has been or is to be reallocated, a message indicating that reallocated bandwidth is now available, determining a priority of the user, determining if a user is a public safety user or a commercial user, or a combination thereof. The processing portion 74 is capable of determining if a user/requester is authorized, determining if additional bandwidth is needed, determining if the need for additional bandwidth is imminent, predicting a need for additional bandwidth, determining an amount of additional bandwidth needed, determining if bandwidth is available in a portion of a shared spectrum designated for public safety use, determining if bandwidth is available in a portion of a shared spectrum designated for commercial use, determining if available bandwidth is being used, preempting a user, reallocating bandwidth, generating a message, releasing allocated bandwidth, or a combination thereof.

The processor 72 can be implemented as a client processor and/or a server processor. In a basic configuration, the processor 72 can include at least one processing portion 74 and memory portion 76. The memory portion 76 can store any information utilized in conjunction with dynamically allocating communications resources. For example, as described above, the memory portion 76 is capable of storing a list of authorized users/requesters, a list of users of potentially available bandwidth, messages to be sent to users, a list of preempted users, predetermined priorities of users, information indicative of whether a user is a public safety user or a commercial user, or a combination thereof. Depending upon the exact configuration and type of processor, the memory portion 76 can be volatile (such as RAM) 80, non-volatile (such as ROM, flash memory, etc.) 82, or a combination thereof. The processor 72 can have additional features/functionality. For example, the processor 72 can include additional storage (removable storage 84 and/or non-removable storage 86) including, but not limited to, magnetic or optical disks, tape, flash, smart cards or a combination thereof. Computer storage media, such as memory portion 76, 80, 82, 84, and 86, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 72. Any such computer storage media can be part of the processor 72.

The processor 72 also can contain communications connection(s) 92 that allow the processor 72 to communicate with other devices, for example. Communications connection(s) 92 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 72 also can have input device(s) 90 such as keyboard, mouse, pen, voice input device, touch input device, etc. Output device(s) 88 such as a display, speakers, printer, etc. also can be included.

The following description sets forth some exemplary telephony radio networks and non-limiting operating environments in which dynamic allocation of communications resources can be implemented. The below-described operating environments should be considered non-exhaustive, however, and thus the below-described network architectures merely show how dynamic allocation of communications resources can be incorporated into existing network structures and architectures. It can be appreciated, however, that dynamic allocation of communications resources can be incorporated into existing and/or future alternative architectures for communication networks as well.

The global system for mobile communication ("GSM") is a widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of dynamic allocation of communications resources can be applied independently of the method for data transport, and do not depend on any particular network architecture, or underlying protocols.

Figure 4:
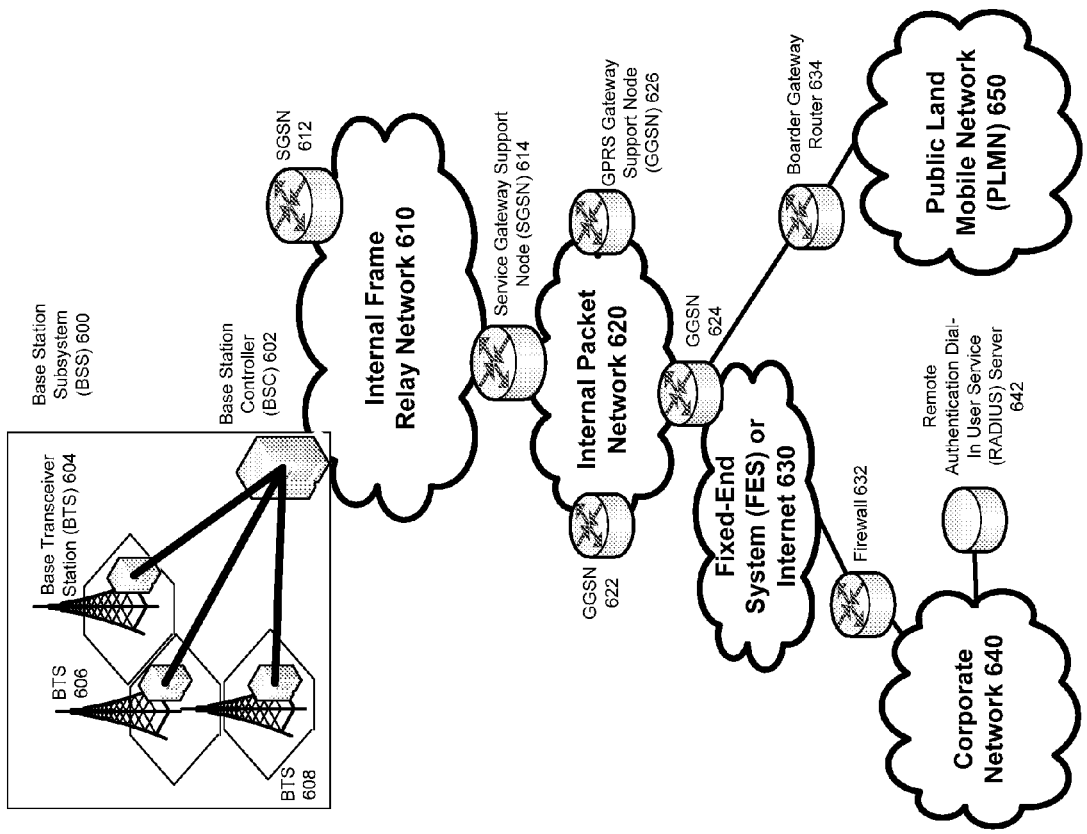
FIG. 4 depicts an overall block diagram of an exemplary packet-based mobile cellular network environment, such as a GPRS network, in which dynamic allocation of communications resources can be practiced.

FIG. 4 depicts an overall block diagram of an exemplary packet-based mobile cellular network environment, such as a GPRS network, in which dynamic allocation of communications resources can be practiced. In an example configuration, the wireless radio network 46 and cellular radio network and towers 44 are encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 12) become connected to the wireless network. In exemplary fashion, the packet traffic originating from user devices (e.g., user device 42) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
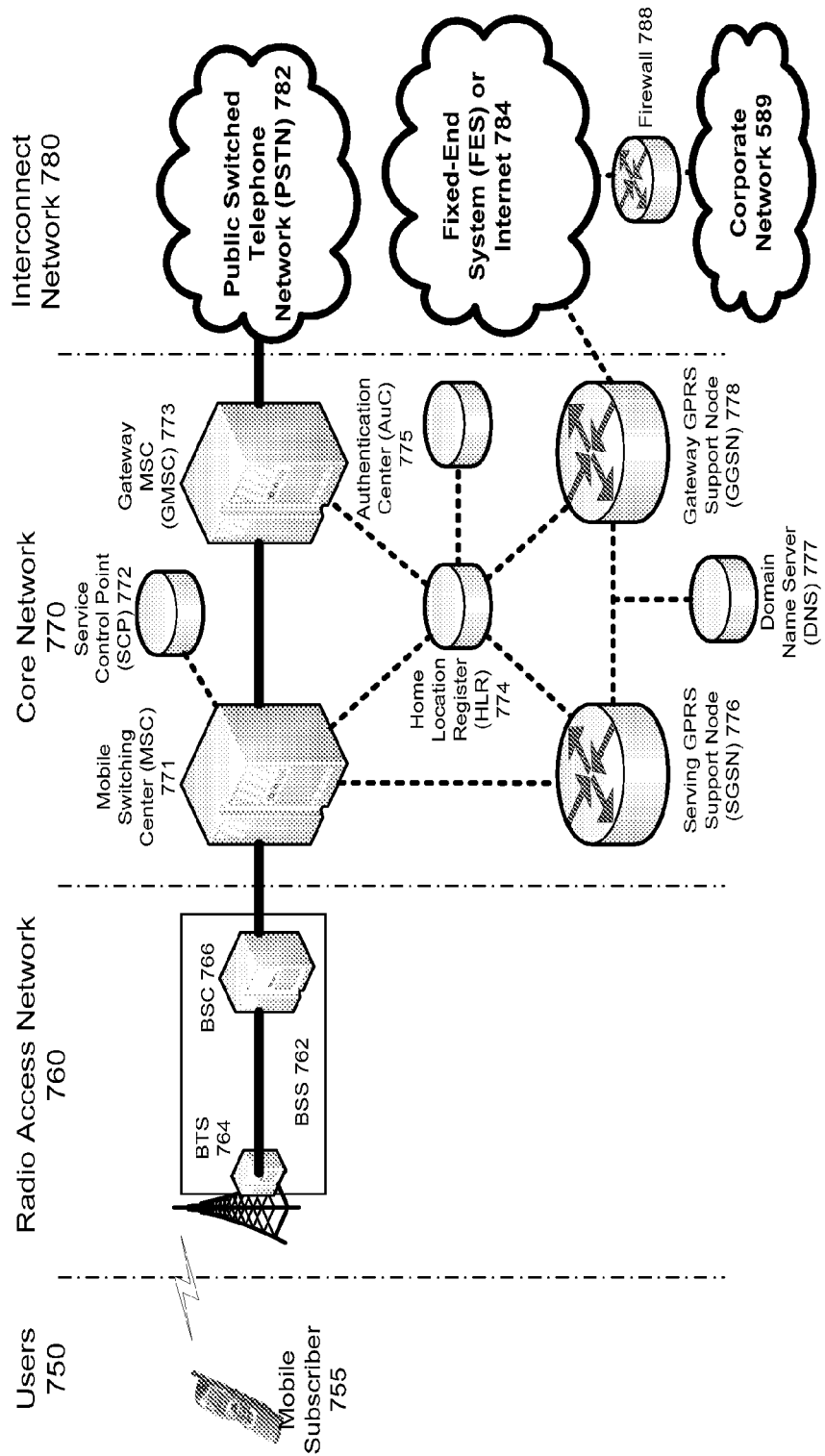
FIG. 5 illustrates an architecture of a typical GPRS network as segmented into four groups.

FIG. 5 illustrates an architecture of a typical GPRS network as segmented into four groups: users 750, radio access network 760, core network 770, and interconnect network 780. In an example configuration the cellular and wireless networks 44, 46 are encompassed by the radio access network 760, core network 770, and interconnect network 780. Users 750 comprise a plurality of end users (though only mobile subscriber 755 is shown in FIG. 5). In an example embodiment, the device depicted as mobile subscriber 755 comprises mobile device 42. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user (e.g., requester and sometimes to the actual portable device, such as the mobile device 42, used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of dynamic allocation of communications resources can include but are not limited to Gateway GPRS Support Node tables, Fixed End System router tables, firewall systems, VPN tunnels, and any number of other network elements as required by the particular digital network.

Figure 6:
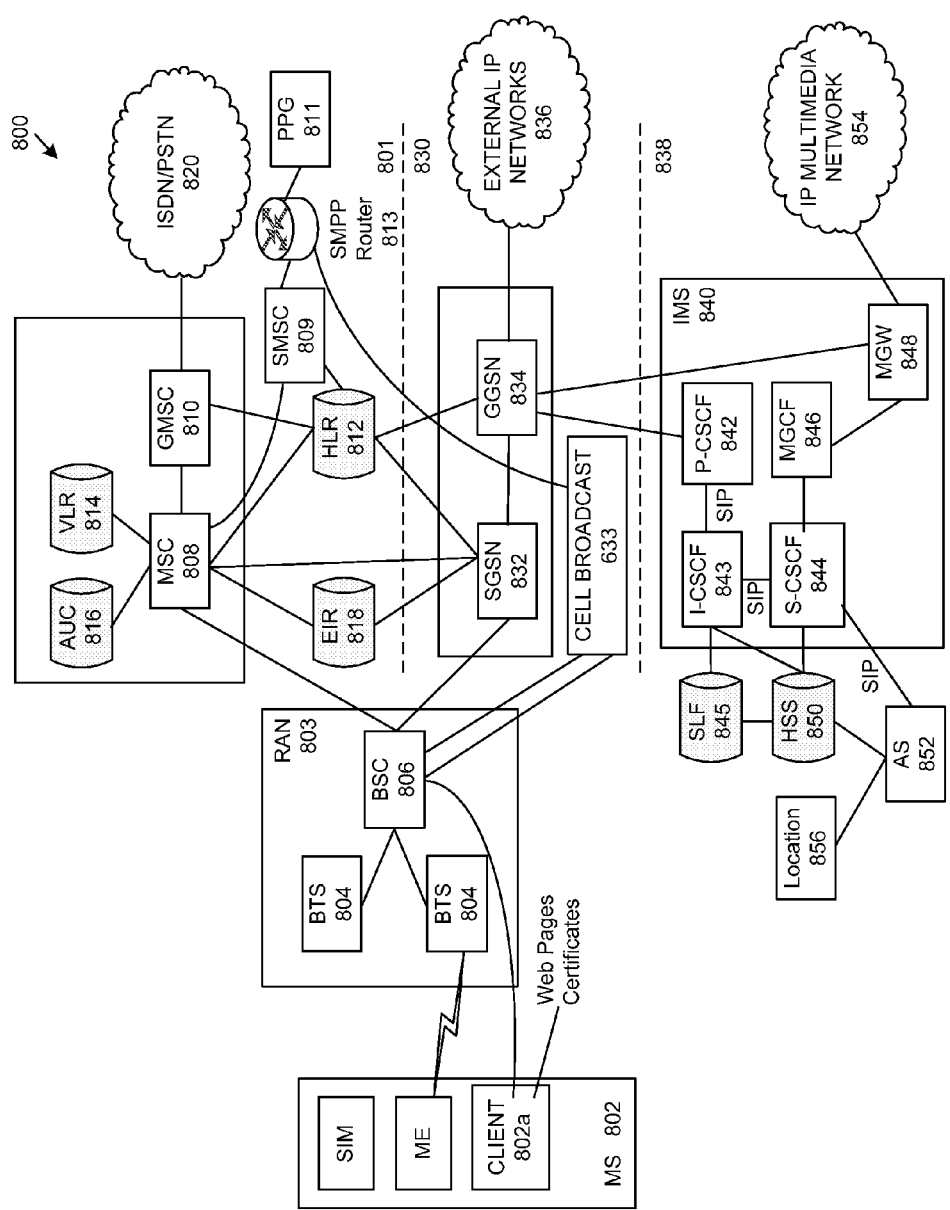
FIG. 6 illustrates an example alternate block diagram of an exemplary GSM/GPRS/IP multimedia network architecture in which dynamic allocation of communications resources can be incorporated.

FIG. 6 illustrates another exemplary block diagram view of a GSM/GPRS/IP multimedia network architecture 800 in which dynamic allocation of communications resources can be incorporated. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of dynamic allocation of communications resources have been described in connection with various computing devices, the underlying concepts can be applied to any computing device or system capable of implementing dynamic allocation of communications resources. The various techniques described herein can be implemented in connection with hardware or software or, where appropriate, with a combination of both. Thus, the methods and apparatus for dynamic allocation of communications resources, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing dynamic allocation of communications resources. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for dynamic allocation of communications resources also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing dynamic allocation of communications resources. When implemented on a general-purpose processor, the program code combines with the processor to provide a unique apparatus that operates to invoke the functionality of dynamic allocation of communications resources. Additionally, any storage techniques used in connection with dynamic allocation of communications resources can invariably be a combination of hardware and software.

While dynamic allocation of communications resources have been described in connection with the various embodiments of the various figures, it is to be understood that other similar embodiments can be used or modifications and additions can be made to the described embodiment for performing the same function of dynamic allocation of communications resources without deviating therefrom. For example, one skilled in the art will recognize that a system for implementing dynamic allocation of communications resources as described may apply to any environment, whether wired or wireless, and may be applied to any number of devices connected via a communications network and interacting across the network. Therefore, dynamic allocation of communications resources should not be limited to any single embodiment, but rather should be construed in breadth and scope in accordance with the appended claims.

What is claimed is:

1. A method comprising:
responsive to a determination that usage of a communication spectrum by a first user exceeds a first predetermined threshold, and a prediction that usage of the communication spectrum by the first user will exceed a second predetermined threshold, determining that the first user of the communications spectrum is authorized to utilize an additional portion of the communications spectrum for public safety use;
upon a determination that the first user is authorized to utilize the additional portion of the communications spectrum for public safety use, determining that the additional portion of the spectrum is in use;
upon a determination that the additional portion of the communications spectrum is not in use, allocating the additional portion of the communications spectrum to the first user;
upon a determination that the additional portion of the communications spectrum is in use:
preempting at least one second user from utilizing the additional portion of the communications spectrum; and
allocating the additional portion of the communications spectrum to the first user; and
responsive to a determination that usage of the communication spectrum by the first user no longer exceeds the first predetermined threshold, and a prediction that a usage of the communication spectrum by the first user will not exceed the second predetermined threshold, making the allocated additional portion of the communications spectrum available to other than the preempted at least one second user, wherein the at least one second user remains permanently preempted from utilizing the additional portion of the communications spectrum.

2. The method in accordance with claim 1, wherein:
the first user utilizes the communications spectrum for public safety use; and
the at least one preempted second user utilizes the communications spectrum for commercial use.

3. The method in accordance with claim 1, wherein the additional portion of the communications spectrum is allocated to the first user in response to an occurrence of an emergency.

4. The method in accordance with claim 1, wherein the communications spectrum comprises a first portion designated for use by the first user, and a second portion designated for use by the at least one second user, the method further comprising:
determining that the additional portion of the spectrum is in use in the first portion of the communication spectrum;
upon a determination that the additional portion of the spectrum is not in use in the first portion of the communication spectrum, allocating the additional portion of the first portion of the communications spectrum to the first user; and
upon a determination that the additional portion of the first portion of the communications spectrum is in use:
preempting at least one second user from utilizing the additional portion of the second portion of the communications spectrum; and
allocating the additional portion of the second portion of the communications spectrum to the first user.

5. The method in accordance with claim 1, wherein the at least one second user is selected for preemption in accordance with a respective predetermined priority assigned to each at least one second user.

6. A system comprising:
memory having executable instructions stored thereon; and
a processor, coupled to the memory, for executing the executable instructions to perform operations comprising:
responsive to a determination that usage of a communication spectrum by a first user exceeds a first predetermined threshold, or a prediction that usage of the communication spectrum by the first user will exceed a second predetermined threshold, determining that the first user of the communications spectrum is authorized to utilize an additional portion of the communications spectrum for public safety use;
upon a determination that the first user is authorized to utilize the additional portion of the communications spectrum for public safety use, determining that the additional portion of the spectrum is in use;
upon a determination that the additional portion of the spectrum is not in use, allocating the additional portion of the communications spectrum to the first user;
upon a determination that the additional portion of the communications spectrum is in use:
preempting at least one second user from utilizing the additional portion of the communications spectrum; and
allocating the additional portion of the communications spectrum to the first user; and
responsive to a determination that usage of the communication spectrum by the first user no longer exceeds the first predetermined threshold, and a prediction that a usage of the communication spectrum by the first user will not exceed the second predetermined threshold, making the allocated additional portion of the communications spectrum available to other than the preempted at least one second user, wherein the at least one second user remains permanently preempted from utilizing the additional portion of the communications spectrum.

7. The system in accordance with claim 6, wherein:
the first user utilizes the communications spectrum for public safety use; and
the second user utilizes the communications spectrum for commercial use.

8. The system in accordance with claim 6, wherein the additional portion of the communications spectrum is allocated to the first user in response to an occurrence of an emergency.

9. The system in accordance with claim 6, wherein the communications spectrum comprises a first portion designated for use by the first user, and a second portion designated for use by the at least one second user, the operations further comprising:
   determining that the additional portion of the spectrum is in use in the first portion of the communication spectrum;
   upon a determination that the additional portion of the spectrum is not in use in the first portion of the communication spectrum, allocating the additional portion of the first portion of the communications spectrum to the first user; and
   upon a determination that the additional portion of the first portion of the communications spectrum is in use:
      preempting at least one second user from utilizing the additional portion of the second portion of the communications spectrum; and
      allocating the additional portion of the second portion of the communications spectrum to the first user.

10. The system in accordance with claim 6, wherein the at least one second user is selected for preemption in accordance with a respective predetermined priority assigned to each at least one second user.

11. A computer-readable storage medium, the computer-readable storage medium not being a transient signal, the computer-readable storage medium having stored thereon computer-executable instructions for causing a processor to perform operations comprising:
   responsive to a determination that usage of a communication spectrum by a first user exceeds a first predetermined threshold, and a prediction that usage of the communication spectrum by the first user will exceed a second predetermined threshold, determining that the first user of the communications spectrum is authorized to utilize an additional portion of the communications spectrum for public safety use;
   upon a determination that the first user is authorized to utilize the additional portion of the communications spectrum for public safety use, determining that the additional portion of the spectrum is in use;
   upon a determination that the additional portion of the spectrum is not in use, allocating the additional portion of the communications spectrum to the first user;
   upon a determination that the additional portion of the communications spectrum is in use:
      preempting at least one second user from utilizing the additional portion of the communications spectrum; and
      allocating the additional portion of the communications spectrum to the first user; and
   responsive to a determination that usage of the communication spectrum by the first user no longer exceeds the first predetermined threshold, and a prediction that a usage of the communication spectrum by the first user will not exceed the second predetermined threshold, making the allocated additional portion of the communications spectrum available to other than the preempted at least one second user, wherein the at least one second user remains permanently preempted from utilizing the additional portion of the communications spectrum.

12. The computer-readable storage medium in accordance with claim 11, wherein:
   the first user utilizes the communications spectrum for public safety use; and
   the second user utilizes the communications spectrum for commercial use.

13. The computer-readable storage medium in accordance with claim 11, wherein the additional portion of the communications spectrum is allocated to the first user in response to an occurrence of an emergency.

14. The computer-readable storage medium in accordance with claim 11, wherein the communications spectrum comprises a first portion designated for use by the first user, and a second portion designated for use by the at least one second user, the operations further comprising:
   determining that the additional portion of the spectrum is in use in the first portion of the communication spectrum;
   upon a determination that the additional portion of the spectrum is not in use in the first portion of the communication spectrum, allocating the additional portion of the first portion of the communications spectrum to the first user; and
   upon a determination that the additional portion of the first portion of the communications spectrum is in use:
      preempting at least one second user from utilizing the additional portion of the second portion of the communications spectrum; and
      allocating the additional portion of the second portion of the communications spectrum to the first user.

15. The computer-readable storage medium in accordance with claim 11, wherein the at least one second user is selected for preemption in accordance with a respective predetermined priority assigned to each at least one second user.

* * * * *